Patented June 10, 1941

2,245,262

UNITED STATES PATENT OFFICE 2,245,262

AZO COMPOUNDS AND MATERIAL COLORED THEREWITH

Joseph B. Dickey and James G. McNally, Rochester, N. Y., assignors to Eastman Kodak Company, Rochester, N. Y., a corporation of New Jersey No Drawing. Application September 6, 1939, Serial No. 293,576

9 Claims. (Cl. 260—155)

The present invention relates to azo compounds and to fibrous organic derivatives of cellulose colored therewith. More particularly it relates to azo compounds having the general formulae:

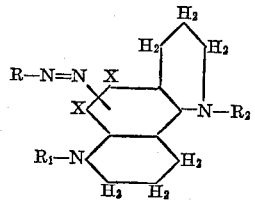

and

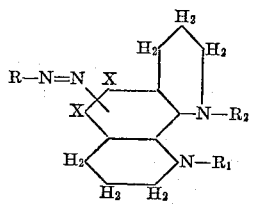

wherein in each formula R represents a benzene nucleus, $R_1$ and $R_2$ each represent a member selected from the group consisting of hydrogen, an alkyl group, a hydroxyalkyl group, an alkoxyalkyl group, a sulfoalkyl group, a sulfatoalkyl group, an acetoxyalkyl group, a methyl carbonyl group, an alkoxymethylcarbonyl group, and a phenyl group, one X represents the position on the phenanthroline nucleus to which the azo group is attached, and the other X represents a member selected from the group consisting of hydrogen, a halogen, an alkyl group, a hydroxyalkyl group, an alkoxy group, an acetamino group, and wherein substituents selected from the group consisting of a hydroxyl group, an alkyl group, an alkoxy group, an acetate group, a sulphonic acid group, a sulfato group, and a phosphato group may replace nuclear hydrogen in the saturated rings.

While our invention is primarily concerned with the monazo compounds, it should be noted that polyazo compounds are likewise included within the scope of the invention. R in the above formulae, for example, may be an aromatic component containing an azo bond such as an azobenzene radical.

It is an object, therefore, of our invention to prepare the class of azo compounds above described and to color cellulose organic derivatives, particularly cellulose acetate, in the form of fibers, threads, yarns and fabric materials therewith.

The azo compounds of the invention may be prepared by coupling the diazo salts of various suitable arylamines with octahydro derivatives of 1,7- and 1,10-phenanthrolines having the following general formulae:

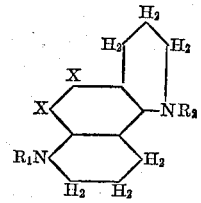

and

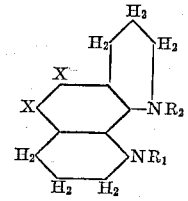

wherein each $R_1$, $R_2$, and X have the same meanings as previously defined, and wherein one or more of the nuclear hydrogens may or may not be substituted by halogen, a hydroxyl group, an alkyl group, an alkoxy group, a hydroxyalkyl group, an acetamino group, or an acidic radical.

The above type of intermediates may be obtained using a 5-nitroquinoline or an 8-nitroquinoline as the starting material, hydrogenating catalytically with nickel or chemically with a reducing metal in the presence of a mineral acid, condensing the resulting 5-amino- or 8-aminotetrahydroquinoline with a compound selected from the group including 3-chloropropanol-1, 1-chloropropandiol-2,3, epichlorhydrin and similar kind of compounds, and then heating to cause ring closure of the side chain.

It will be understood that the starting material may also be a substituted 5-nitro- or 8-nitroquinoline. For example, 5-nitroquinoline may be substituted in positions 2, 3, 4, 7 and 8 by one or more substituents selected from the group consisting of chlorine, bromine, a hydroxyl group, an alkyl group such as methyl, ethyl, and the like, a hydroxymethyl group, a hydroxyethyl group, a methoxy group, an acetamino group, and acid radicals of sulphonic acid, sulphuric acid, and phosphoric acid; and similarly 8-nitroquinoline may be substituted in positions 2, 3, 4, 5 and 6 by the same kind of substituents as above mentioned.

The following examples illustrate the preparation of some of the azo compounds of our invention.

Example 1

1 mole of o-chloroaniline is dissolved in a mixture of ice and dilute hydrochloric acid and diazotized with sodium nitrite. The solution is then added slowly with stirring to 1 mole of the following compound:

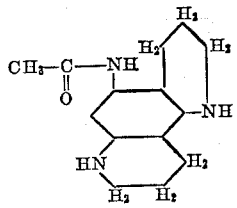

dissolved in cold dilute hydrochloric acid. After standing for a short time, the reaction mixture is neutralized with sodium acetate using Congo red as the indicator, and when coupling is complete, the dye is filtered out, washed and dried. Cellulose acetate is colored yellow shades from an aqueous suspension of the dye.

The azo compound thus obtained has the probable formula:

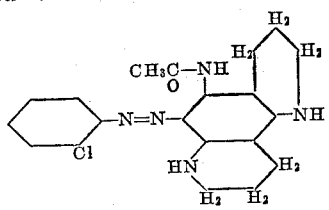

In place of o-chloroaniline there may be substituted aniline, o-bromoaniline, or o-fluoroaniline.

Example 2

1 mole of methylanthranilate is diazotized and coupled with 1 mole of the compound illustrated by the following formula:

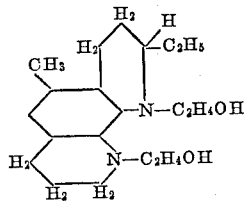

using the process described in Example 1. Cellulose acetate is colored orange shades from an aqueous suspension of the dye.

The azo compound obtained has the formula:

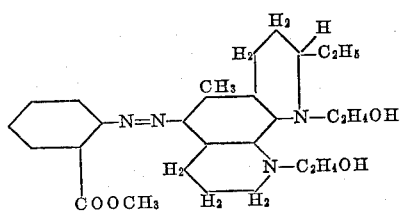

Example 3

1 mole of 2,4-dinitro-6-chloroaniline is dissolved in 2200 ccs. of hot acetic acid, cooled to room temperature, and then diazotized at 15° C. with a sulphuric acid solution containing an excess of sodium nitrite. The coupling reaction is performed by slowly adding the above diazo solution to a mixture of ice and dilute hydrochloric acid containing 1 mole of the compound

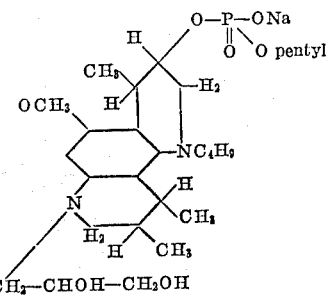

after which the mixture is made neutral to Congo red indicator with sodium acetate. When the coupling reaction is complete, the dye is filtered out, washed and dried. Cellulose acetate is colored blue shades from an aqueous suspension of the dye.

The azo compound obtained has the formula:

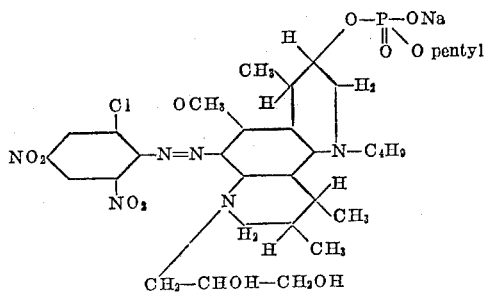

Example 4

1 mole of 2,4-dinitro-6-bromoaniline is diazotized and coupled by the process described in Example 3 with 1 mole of the following compound:

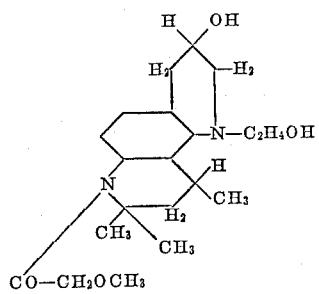

The dye obtained colors cellulose acetate red-blue shades from an aqueous suspension of the dye.

The azo compound has the probable formula:

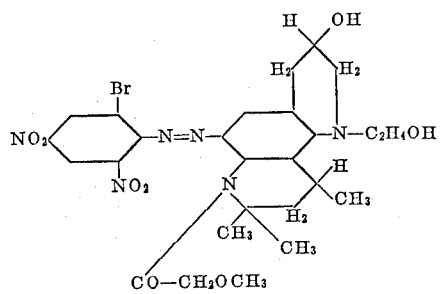

The scope of our invention will be more fully apparent by reference to the following table, wherein are disclosed various suitable diazotization and coupling components, the dyes resulting therefrom coloring cellulose acetate fibers the shades of color designated.

Table

| Diazo component | Coupling component | Shade on cellulose acetate |
|---|---|---|
| p-Aminophenol | (structure with OH, NH, N—$C_2H_4OH$) | Orange. |
| p-Nitroaniline | (structure with $OCOCH_3$, Cl, N—$C_2H_4OCH_3$, N—$C_2H_4OCOCH_3$) | Wine. |
| p-Nitro-o-chloroaniline | (structure with Cl, N—$C_2H_4SO_4NH_4$, $COCH_3$) | Do. |
| p-Nitro-o-bromoaniline | (structure with $CH_3CO$—NH, N—cetyl, N—$C_2H_4SO_3Na$, OH) | Do. |
| 2,4-dinitroaniline | (structure with HC(O)—NH, OH, N—$C_2H_4OH$, N—$C_3H_6OH$ (β or γ)) | Purple. |
| 2,4,6-trinitroaniline | (structure with $OSO_3Na$, $OCH_3$, NH, N—$CH_2CONH_2$, $CH_3$) | Blue. |

| Diazo component | Coupling component | Shade on cellulose acetate |
|---|---|---|
| p-Aminoazobenzene | (structure) | Red. |
| 2-amino-6-methoxy benzothiazole | (structure) | Wine. |
| 2-amino-5-nitrobenzene phenylmethylsulfone | (structure) | Violet. |

In the application of the azo compounds of our invention to the coloration of organic derivatives of cellulose, particularly cellulose acetate, the dye compounds are ordinarily ground to a paste with a dispersing agent such as soap, a sulfonated oil, or a higher fatty acid glyceryl sulfate, and the resulting paste then dispersed in water. The material to be colored is immersed in the dispersion starting with a bath temperature of approximately 45–55° C., and then gradually increasing the temperature to 80–85° C., at which point it is maintained for several hours. The exhaustion of the dye bath may be facilitated by the addition of sodium chloride during the dyeing operation. When the material has been dyed to the desired shade, it is removed from the bath, washed with soap, rinsed and dried. Where the particular azo compound contains a solubilizing group which makes it water-soluble, the dye may be applied directly from an aqueous solution without the necessity of employing a dispersing or solubilizing agent. For a more detailed description as to how the water-soluble azo dyes of our invention may be employed for the coloring of fibrous materials, reference may be had to McNally and Dickey U. S. Patent No. 2,107,898, reissued February 8, 1938.

While our invention is illustrated more particularly in connection with cellulose acetate, a material to which the invention is especially adapted, it will be understood that the azo dyes above described are not limited exclusively to cellulose acetate but are likewise applicable for coloring organic derivatives of cellulose in general, including both the hydrolyzed as well as the unhydrolyzed organic acid esters of cellulose such as cellulose formate, cellulose acetate, cellulose propionate, cellulose butyrate, and the hydrolyzed as well as the unhydrolyzed mixed organic acid esters of cellulose such as cellulose acetate-propionate, cellulose acetate-butyrate, and the cellulose ethers such as methyl cellulose, ethyl cellulose, and benzyl celluose.

We claim:

1. The azo compounds selected from the group consisting of azo compounds having the general formulae:

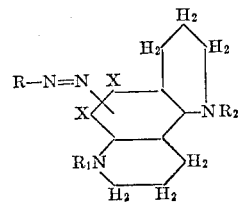

and

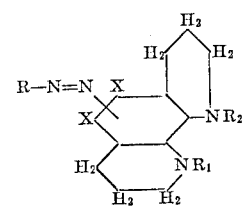

wherein in each formula the azo group is attached to one of the positions marked X, the remaining X being selected from the group consisting of hydrogen, halogen, an alkyl group, a hydroxyalkyl group, an alkoxy group, an acetamino group, and a hydroxyacetamino group, R represents a benzene nucleus, $R_1$ and $R_2$ each represent a member selected from the group consisting of hydrogen, an alkyl group, a hydroxyalkyl group, an alkoxyalkyl group, a sulfoalkyl group, a sulfatoalkyl group, a methyl carbonyl group, an alkoxymethylcarbonyl group, and a phenyl group, and wherein substituents selected from the group consisting of a hydroxyl group, an alkyl group, an alkoxy group, a sulphonic acid group, and an ester group may replace nuclear hydrogen in the saturated rings.

2. The azo compounds selected from the group consisting of azo compounds having the general formulae:

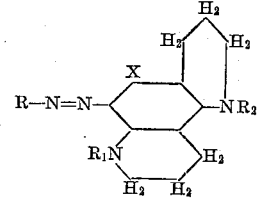

and

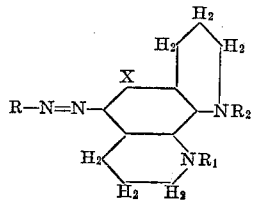

wherein X represents a member selected from the group consisting of hydrogen, halogen, an alkyl group, a hydroxyalkyl group, an alkoxy group, an acetamino group, and a hydroxyacetamino group, R represents a benzene nucleus, $R_1$ and $R_2$ each represent a member selected from the group consisting of hydrogen, an alkyl group, a hydroxyalkyl group, an alkoxyalkyl group, a sulfoalkyl group, a sulfatoalkyl group, a methyl carbonyl group, an alkoxymethylcarbonyl group, and a phenyl group, and wherein substituents selected from the group consisting of a hydroxyl group, an alkyl group, an alkoxy group, a sulphonic acid group, and an ester group may replace nuclear hydrogen in the saturated rings.

3. The azo compounds having the general formula:

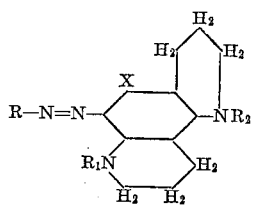

wherein X represents a member selected from the group consisting of hydrogen, halogen, an alkyl group, a hydroxyalkyl group, an alkoxy group, an acetamino group, and a hydroxyacetamino group, R represents a benzene nucleus, $R_1$ and $R_2$ each represent a member selected from the group consisting of hydrogen, an alkyl group, a hydroxyalkyl group, an alkoxyalkyl group, a sulfoalkyl group, a sulfatoalkyl group, a methyl carbonyl group, an alkoxymethylcarbonyl group, and a phenyl group, and wherein substituents selected from the group consisting of a hydroxyl group, an alkyl group, an alkoxy group, a sulphonic acid group, and an ester group may replace nuclear hydrogen in the saturated rings.

4. The azo compounds having the general formula:

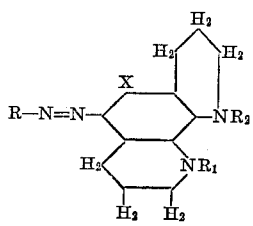

wherein X represents a member selected from the group consisting of hydrogen, halogen, an alkyl group, a hydroxyalkyl group, an alkoxy group, an acetamino group, and a hydroxyacetamino group, R represents a benzene nucleus, $R_1$ and $R_2$ each represent a member selected from the group consisting of hydrogen, an alkyl group, a hydroxyalkyl group, an alkoxyalkyl group, a sulfoalkyl group, a sulfatoalkyl group, a methyl carbonyl group, an alkoxymethylcarbonyl group, and a phenyl group, and wherein substituents selected from the group consisting of a hydroxyl group, an alkyl group, an alkoxy group, a sulphonic acid group, and an ester group may replace nuclear hydrogen in the saturated rings.

5. The azo compounds selected from the group consisting of azo compounds having the general formulae:

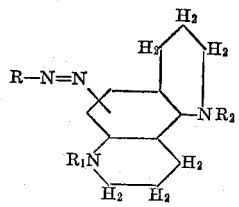

and

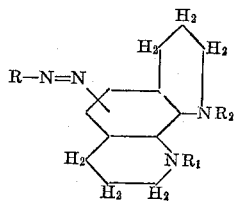

wherein R represents a benzene nucleus, and $R_1$ and $R_2$ each represent a member selected from the group consisting of hydrogen, an alkyl group, a hydroxyalkyl group, an alkoxyalkyl group, a sulfoalkyl group, a sulfatoalkyl group, a methylcarbonyl group, an alkoxymethylcarbonyl group, and a phenyl group.

6. The azo compounds selected from the group consisting of azo compounds having the general formulae:

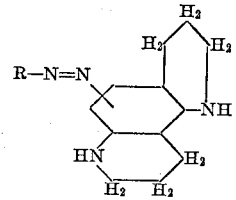

and

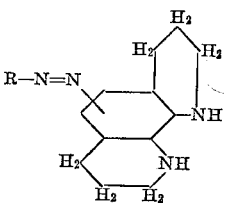

wherein R represents a benzene nucleus.

7. Material made of or containing an organic derivative of cellulose colored with an azo compound selected from the group consisting of azo compounds having the general formulae:

and

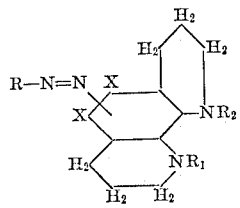

wherein in each formula the azo group is attached to one of the positions marked X, the remaining X being selected from the group consisting of hydrogen, halogen, an alkyl group, a hydroxyalkyl group, an alkoxy group, an acetamino group, and a hydroxyacetamino group, R represents a benzene nucleus, $R_1$ and $R_2$ each represent a member selected from the group consisting of hydrogen, an alykyl group, a hydroxyalkyl group, an alkoxyalkyl group, a sulfoalkyl group, a sulfatoalkyl group, a methyl carbonyl group, an alkoxymethylcarbonyl group, and a phenyl group, and wherein substituents selected from the group consisting of a hydroxyl group, an alkyl group, an alkoxy group, a sulphonic acid group, and an ester group may replace nuclear hydrogen in the saturated rings.

8. Material made of or containing cellulose acetate colored with an azo compound selected from the group consisting of azo compounds having the general formulae:

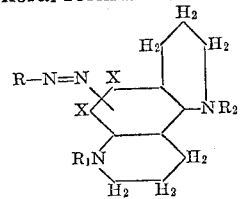

and

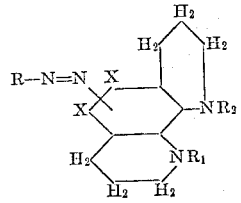

wherein in each formula the azo group is attached to one of the positions marked X, the remaining X being selected from the group consisting of hydrogen, halogen, an alkyl group, a hydroxyalkyl group, an alkoxy group, an acetamino group, and a hydroxyacetamino group, R represents a benzene nucleus, $R_1$ and $R_2$ each represent a member selected from the group consisting of hydrogen, an alkyl group, a hydroxyalkyl group, an alkoxyalkyl group, a sufoalkyl group, a sulfatoalkyl group, a methyl carbonyl group, an alkoxymethylcarbonyl group, and a phenyl group, and wherein substituents selected from the group consisting of a hydroxyl group, an alkyl group, an alkoxy group, a sulphonic acid group, and an ester group may replace nuclear hydrogen in the saturated rings.

9. Material made of or containing cellulose acetate colored with an azo compound selected from the group consisting of azo compounds having the general formulae:

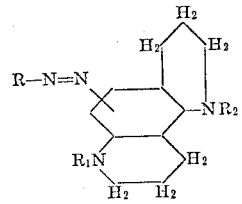

and

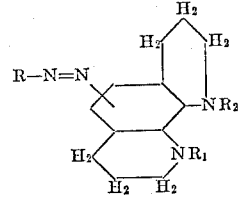

wherein R represents a benzene nucleus, and $R_1$ and $R_2$ each represent a member selected from the group consisting of hydrogen, an alkyl group, a hydroxyalkyl group, an alkoxyalkyl group, a sulfoalkyl group, a sulfatoalkyl group, a methylcarbonyl group, an alkoxymethylcarbonyl group, and a phenyl group.

JOSEPH B. DICKEY.
JAMES G. McNALLY.